US012682765B2

(12) United States Patent
Cui

(10) Patent No.: US 12,682,765 B2
(45) Date of Patent: Jul. 14, 2026

(54) METHOD FOR MONITORING UNMANNED AERIAL VEHICLE, AND TERMINAL AND READABLE STORAGE MEDIUM

(71) Applicant: AUTEL ROBOTICS CO., LTD., Shenzhen (CN)

(72) Inventor: Guangxin Cui, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 28 days.

(21) Appl. No.: 18/678,788

(22) Filed: May 30, 2024

(65) Prior Publication Data

US 2024/0321115 A1 Sep. 26, 2024

Related U.S. Application Data

(63) Continuation of application No. PCT/CN2022/079361, filed on Mar. 4, 2022.

(30) Foreign Application Priority Data

Nov. 30, 2021 (CN) ......................... 202111441727.X

(51) Int. Cl.

*G08G 5/22* (2025.01)
*G08G 5/55* (2025.01)
*G08G 5/57* (2025.01)

(52) U.S. Cl.

CPC ................. *G08G 5/22* (2025.01); *G08G 5/55* (2025.01); *G08G 5/57* (2025.01)

(58) Field of Classification Search

CPC ............... G08G 5/22; G08G 5/55; G08G 5/57
See application file for complete search history.

(56) References Cited

U.S. PATENT DOCUMENTS 10,086,954 B2 * 10/2018 Zhong .................... B64U 30/20

FOREIGN PATENT DOCUMENTS

CN 104881041 A 9/2015
CN 106796481 A 5/2017
(Continued)

OTHER PUBLICATIONS

The International Search Report and Written Opinion both dated Aug. 11, 2022; PCT/CN2022/079361 with English Translation.
(Continued)

*Primary Examiner* — Steven Lim
*Assistant Examiner* — James E Munion

(57) ABSTRACT

The present disclosure relates to the field of unmanned aerial vehicle technologies, and provides a method for monitoring an unmanned aerial vehicle, a terminal and a non-volatile computer-readable storage medium. The method for monitoring an unmanned aerial vehicle includes: obtaining first location information, the first location information including a location parameter of a home point of an unmanned aerial vehicle; obtaining second location information, the second location information including a location parameter of a current location of the unmanned aerial vehicle; and displaying a relative location of the unmanned aerial vehicle in a first terminal according to the first location information and the second location information by using the home point as a reference point. Through the foregoing method, the embodiments of the present disclosure can improve a sense of spatial orientation of the user when controlling the unmanned aerial vehicle.

20 Claims, 5 Drawing Sheets

(56) References Cited

FOREIGN PATENT DOCUMENTS

| | | | | | |
|---|---|---|---|---|---|
| CN | 107077113 A | | 8/2017 | | |
| CN | 112154393 A | | 12/2020 | | |
| CN | 112771350 A | * | 5/2021 | ............. | G01C 21/20 |
| CN | 114035600 A | | 2/2022 | | |

OTHER PUBLICATIONS

The First Chinese Office Action dated Sep. 16, 2022; Appln. No. 202111441727.X with English Translation.

* cited by examiner

METHOD FOR MONITORING UNMANNED AERIAL VEHICLE, AND TERMINAL AND READABLE STORAGE MEDIUM

CROSS-REFERENCE TO RELATED APPLICATIONS

This application is a continuation of International Patent Application No. PCT/CN2022/079361, filed 4 Mar. 2022, which claims priority to Chinese Patent Application No. 202111441727.X, filed 30 Nov. 2021, the entireties of which are hereby incorporated herein by reference.

BACKGROUND

With rapid development of unmanned aerial vehicle technologies, there are increasing market demands for unmanned aerial vehicles for personal use. In an unmanned aerial vehicle for personal use, the unmanned aerial vehicle is generally controlled by a control device to perform aerial photographing on a target area.

However, in a process of implementing the present disclosure, it is found that when a user uses an unmanned aerial vehicle to photograph the target area, a model of the unmanned aerial vehicle in a first terminal is likely to deviate from a preset reference start point during flight of the unmanned aerial vehicle, disorienting the user.

SUMMARY

The present disclosure relates to the field of unmanned aerial vehicle technologies, and in particular, to a method for monitoring an unmanned aerial vehicle, a terminal and a non-volatile computer-readable storage medium.

A technical problem mainly resolved in the embodiments of the present disclosure is to provide a method for monitoring an unmanned aerial vehicle, a terminal and a non-volatile computer-readable storage medium, to resolve or partially alleviate a problem of disorienting a user during flight of an unmanned aerial vehicle.

According to a first aspect of the present disclosure, a method for monitoring an unmanned aerial vehicle is provided, comprising

- obtaining first location information, the first location information including a location parameter of a home point of an unmanned aerial vehicle;
- obtaining second location information, the second location information including a location parameter of a current location of the unmanned aerial vehicle; and
- displaying a relative location of the unmanned aerial vehicle in a first terminal according to the first location information and the second location information by using the home point as a reference point.

According to a second aspect of the present disclosure, a terminal is provided, including:

- a display;
- at least one processor; and
- a memory communicatively connected to the at least one processor, where
- the memory stores instructions executable by the at least one processor, the instructions being executed by the at least one processor to implement the method for monitoring an unmanned aerial vehicle according to any of the foregoing embodiments.

According to a third aspect of the present disclosure, The present disclosure further provides a non-transitory computer-readable storage medium, having computer executable instructions stored therein, where the computer executable instructions are configured for enabling a processor to perform the method for monitoring an unmanned aerial vehicle according to any of the foregoing embodiments.

DETAILED DESCRIPTION

For ease of understanding the present disclosure, the present disclosure is described in more detail below with reference to the accompanying drawings and specific embodiments. It should be noted that, when a component is expressed as "being fixed to" another component, the component may be directly on the another component, or one or more intermediate components may exist between the component and the another component. When an element is expressed as "being connected to" another element, the element may be directly connected to the another element, or one or more intermediate elements may exist between the element and the another element. The terms "vertical", "horizontal", "left", "right" and similar expressions in this specification are merely used for an illustrative purpose.

Unless otherwise defined, meanings of all technical and scientific terms used in this specification are the same as those usually understood by a person skilled in art of the present disclosure. Terms used in the specification of the present disclosure are merely intended to describe objectives of the specific embodiments and are not intended to limit the present disclosure. A term "and/or" used in this specification includes any or all combinations of one or more related listed items.

Figure 1:
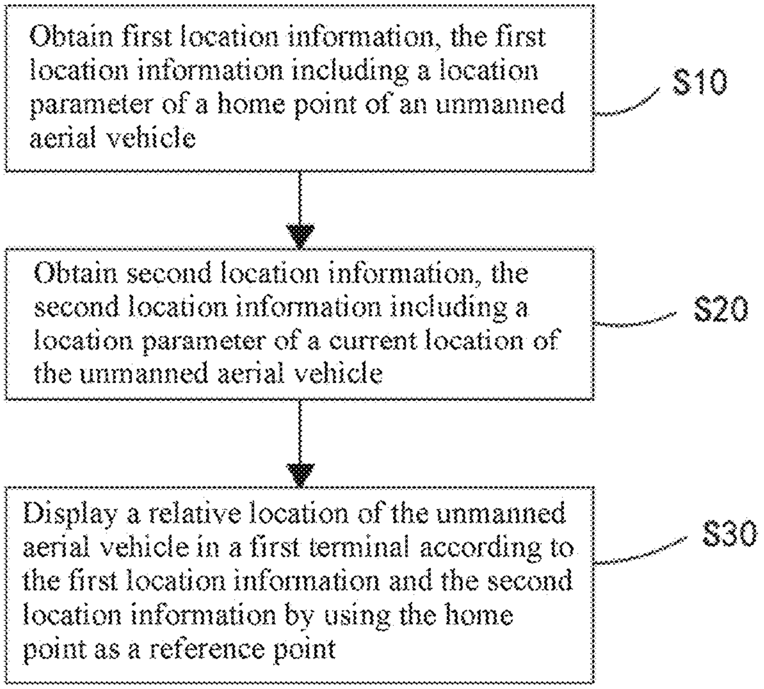
FIG. 1 is an overall schematic diagram of steps of a method for monitoring an unmanned aerial vehicle according to an embodiment of the present disclosure.

An embodiment of the present disclosure provides a method for monitoring an unmanned aerial vehicle. Referring to FIG. 1, the method for monitoring an unmanned aerial vehicle includes:

- Step S10: Obtain first location information, the first location information including a location parameter of a home point of an unmanned aerial vehicle.
- Step S20: Obtain second location information, the second location information including a location parameter of a current location of the unmanned aerial vehicle.
- Step S30: Display a relative location of the unmanned aerial vehicle in a first terminal according to the first location information and the second location information by using the home point as a reference point.

In this embodiment of the present disclosure, the home point is used as the reference point and displayed in the first terminal, so that the unmanned aerial vehicle moves relative to the home point. In this way, during flight of the unmanned aerial vehicle, the home point and the unmanned aerial vehicle are always in the first terminal, thereby alleviating a problem of disorienting a user.

Figure 2:
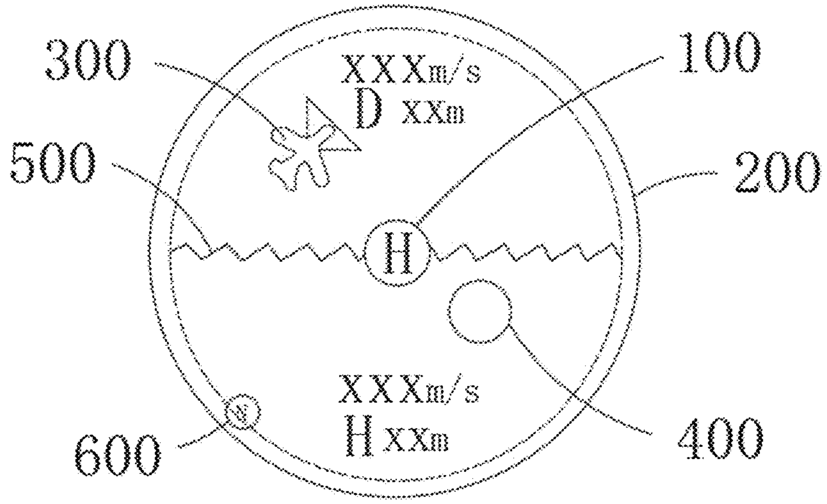
FIG. 2 is a schematic diagram of an attitude sphere for a method for monitoring an unmanned aerial vehicle according to an embodiment of the present disclosure.

In this embodiment of the present disclosure, a display manner of the first terminal may be attitude sphere display, or may be another display manner, for example, map display or small attitude sphere display. The attitude sphere display is used as an example for description herein. Referring to FIG. 1 and FIG. 2, when the first terminal displays the relative location of the unmanned aerial vehicle according to the first location information and the second location information by using the home point as the reference point, the unmanned aerial vehicle generates an unmanned aerial vehicle mark 300 in the first terminal. The unmanned aerial vehicle mark 300 is always located in the attitude sphere 200. The attitude sphere 200 is generated by using the home point 100 as a center. Therefore, when the unmanned aerial vehicle moves under control of the user, the unmanned aerial vehicle mark 300 corresponding to the unmanned aerial vehicle in the first terminal also synchronously moves within the attitude sphere 200. Moreover, regardless of a direction in which the unmanned aerial vehicle mark 300 moves, the home point 100 is always located at a center of the attitude sphere 200. In this way, during flight of the unmanned aerial vehicle, the attitude sphere 200 does not lose the home point 100 as the unmanned aerial vehicle mark 300 moves, which disorients the user.

It should be noted that a distance between the unmanned aerial vehicle and the home point during flight corresponds to a distance between the home point 100 and the unmanned aerial vehicle mark 300 in the attitude sphere 200 according to a preset ratio.

Figure 3:
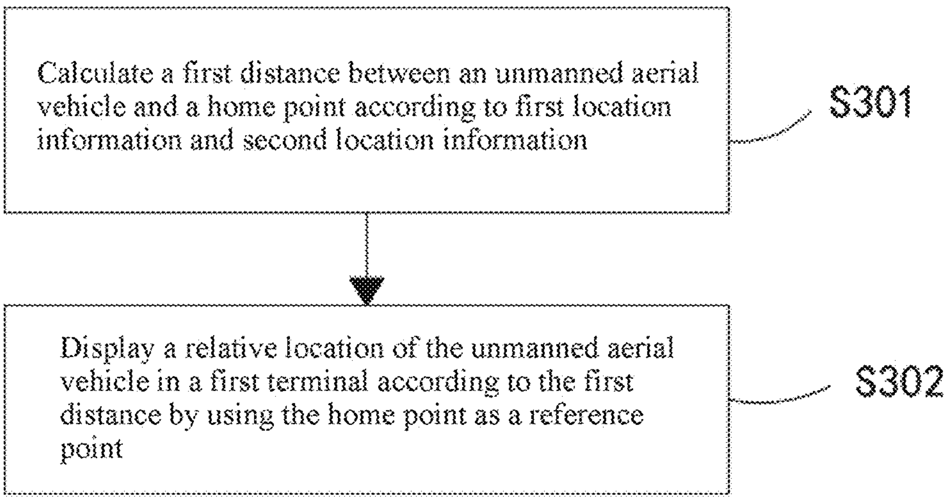
FIG. 3 is a schematic diagram of detailed steps of step S30 in FIG. 1.

In an embodiment of the present disclosure, referring to FIG. 3, the displaying the relative location of the unmanned aerial vehicle in the first terminal according to the first location information and the second location information by using the home point 100 as the reference point includes:

Step S301: Calculate a first distance between the unmanned aerial vehicle and the home point 100 according to the first location information and the second location information.

Step S302: Display the relative location of the unmanned aerial vehicle in the first terminal according to the first distance by using the home point 100 as the reference point.

A start location of the unmanned aerial vehicle is not necessarily the same as a location of the home point 100. For example, after the user controls the unmanned aerial vehicle to take off, the user moves to another location. In this case, a takeoff location of the unmanned aerial vehicle is not the same as the location of the home point 100. Therefore, the first distance is calculated by using the first location information and the second location information so that the distance between the unmanned aerial vehicle and the home point 100 can be fed back to the first terminal. In this way, the distance between the unmanned aerial vehicle mark 300 in the first terminal and the home point 100 is consistent with the real situation, thereby avoiding an error caused because the takeoff location of the unmanned aerial vehicle and the location of the home point 100 are not the same.

In this embodiment of the present disclosure, the displaying the relative location of the unmanned aerial vehicle in the first terminal according to the first distance by using the home point 100 as the reference point includes:

Step S3021: Determine a relative location corresponding to a preset threshold in the first terminal as the relative location of the unmanned aerial vehicle, when the relative location of the unmanned aerial vehicle is greater than or equal to the preset threshold.

Figure 4:
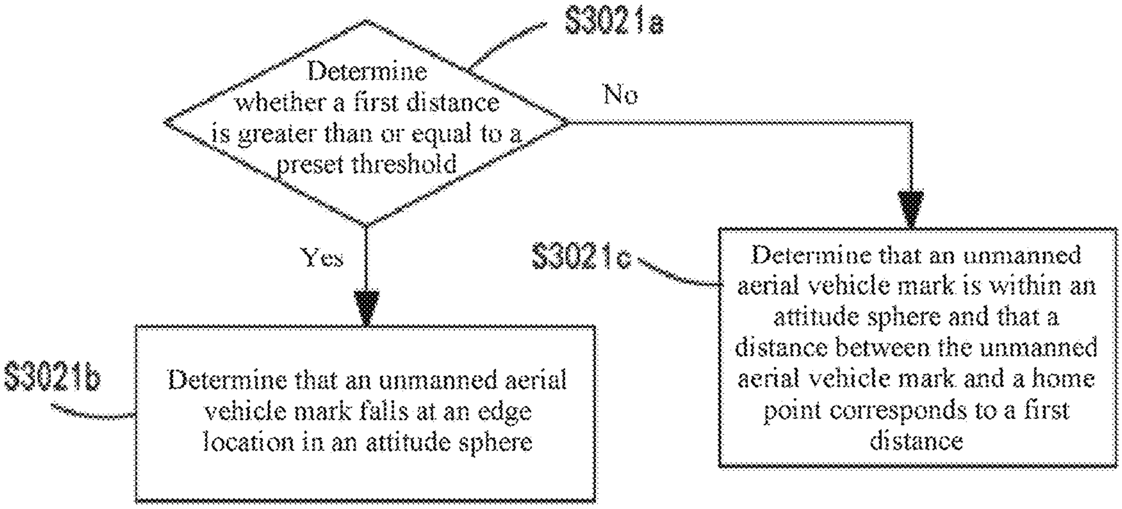
FIG. 4 is a schematic diagram of detailed steps of step S302 in FIG. 4.

In some embodiments, as shown in FIG. 4, step S3021 is divided into the following steps:

Step S3021*a*: Determine whether the first distance is greater than or equal to the preset threshold.

Step S3021*b*: Determine that the unmanned aerial vehicle mark 300 falls at an edge location in the attitude sphere 200, if the first distance is greater than or equal to the preset threshold.

Step S3021*c*: Determine that the unmanned aerial vehicle mark 300 is within the attitude sphere 200 and that the distance between the unmanned aerial vehicle mark 300 and the home point 100 corresponds to the first distance, if the first distance is less than the preset threshold.

Therefore, when a flight distance of the unmanned aerial vehicle is less than the preset threshold, the unmanned aerial vehicle mark 300 may move within the attitude sphere 200 according to a ratio and the preset threshold along an actual flight route of the unmanned aerial vehicle. When the flight distance of the unmanned aerial vehicle is equal to or exceeds the preset threshold, the home point 100 is always located at the center of the attitude sphere 200 and the unmanned aerial vehicle mark 300 is located at a periphery of the attitude sphere 200. Therefore, the user does not lose the reference because the unmanned aerial vehicle flies too far, thereby improving the ability of the user to operate the unmanned aerial vehicle to accurately return to the home point 100.

Figure 5:
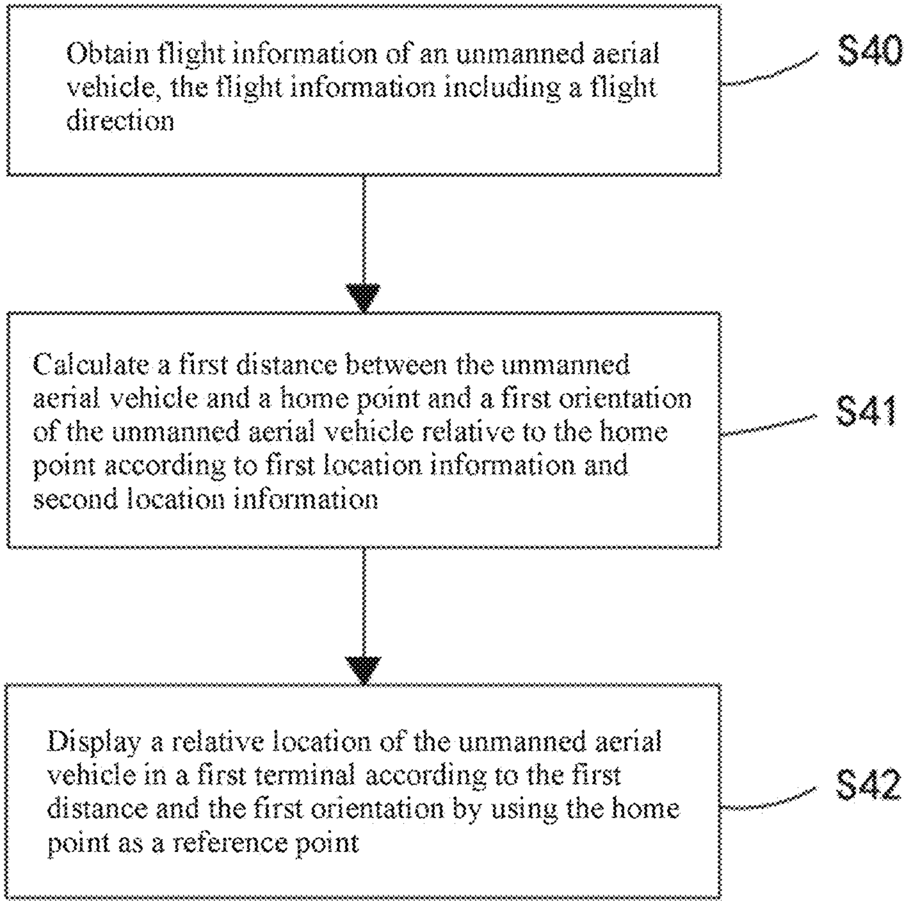
FIG. 5 is another schematic diagram of steps of a method for monitoring an unmanned aerial vehicle according to an embodiment of the present disclosure.

In this embodiment of the present disclosure, as shown in FIG. 5, the method for monitoring an unmanned aerial vehicle further includes:

Step S40: Obtain flight information of the unmanned aerial vehicle, the flight information including a flight direction.

Step S41: Calculate the first distance between the unmanned aerial vehicle and the home point 100 and a first orientation of the unmanned aerial vehicle relative to the home point 100 according to the first location information and the second location information.

Step S42: Display the relative location of the unmanned aerial vehicle mark 300 in the first terminal according to the first distance and the first orientation by using the home point 100 as the reference point.

The first distance between the unmanned aerial vehicle and the home point 100 and the first orientation of the unmanned aerial vehicle relative to the home point 100 are calculated, so that unique coordinates of the unmanned aerial vehicle mark 300 in the attitude sphere 200 can be determined. To be specific, when the user starts the unmanned aerial vehicle to lift off and hold and a lift-off location is not the same as the home point 100, the specific location of the unmanned aerial vehicle relative to the home point 100 can be determined according to the first distance and the first orientation. Therefore, the coordinates of the unmanned aerial vehicle mark 300 in the attitude sphere 200 are matched, to avoid a problem of inconsistency between the coordinates of the unmanned aerial vehicle mark 300 in the attitude sphere 200 and an actual orientation of the unmanned aerial vehicle relative to the home point 100. For example, the unmanned aerial vehicle is located in a northwestern orientation of the home point 100 during lifting off and holding, while the currently flying unmanned aerial vehicle is located in a northeast orientation of the home point 100 in the attitude sphere 200. Therefore, the orientation of the unmanned aerial vehicle relative to the home point 100 may be updated in real time, to facilitate the user to plan a route for the unmanned aerial vehicle to fly to a destination with reference to the unmanned aerial vehicle mark 300 in the attitude sphere 200.

In this embodiment of the present disclosure, the location parameter of the home point 100 of the unmanned aerial vehicle may be updated according to a user input.

The location of the unmanned aerial vehicle relative to the home point 100 changes all the time in a process in which the user operates the unmanned aerial vehicle to fly. Therefore, during flight, when the unmanned aerial vehicle is about to leave an effective range of controlling the unmanned aerial vehicle by the user, the user needs to move toward the unmanned aerial vehicle, ensuring that the unmanned aerial vehicle is always in an effective control range. In this case, the user can replace the original home point by inputting coordinates of a new home point 100, so that the unmanned aerial vehicle lands at the new home point when returning. This avoids a case in which the user needs to return to the original home point to retrieve the unmanned aerial vehicle because the unmanned aerial vehicle lands at the initial home point when returning after the user moves to maintain the effective control range.

In some embodiments, the flight information of the unmanned aerial vehicle further includes a gimbal orientation, a horizontal flight speed, a vertical flight speed and an altitude of the unmanned aerial vehicle. The method for monitoring an unmanned aerial vehicle further includes:

displaying at least one of the first distance, the gimbal orientation, the horizontal flight speed, the vertical flight speed or the altitude in the first terminal.

The user may call or hide the flight information such as the first distance, the gimbal orientation, the horizontal flight speed, the vertical flight speed and the altitude respectively in the first terminal according to a requirement of the user. The first distance can intuitively feed back a linear distance between the unmanned aerial vehicle and the home point 100 to the user. The gimbal orientation can feed back an orientation of a gimbal mounted on the unmanned aerial vehicle relative to a nose of the unmanned aerial vehicle to the user. The horizontal flight speed can feed back a movement speed of the unmanned aerial vehicle in a horizontal direction to the user. The vertical flight speed can feed back a flight speed of the unmanned aerial vehicle in a vertical direction to the user. The altitude can feed back a vertical altitude of the unmanned aerial vehicle relative to the home point 100 to the user. Therefore, the user can obtain a real-time environmental status and a gimbal photographing orientation of the unmanned aerial vehicle by using the first distance, the gimbal orientation, the horizontal flight speed, the vertical flight speed and the altitude displayed in the attitude sphere 200, so that the user is ready to control the unmanned aerial vehicle for a next stage of flight. For example, when the user needs to obtain four pieces of flight information including the first distance, the horizontal flight speed, the vertical flight speed and the altitude all the time, the user may call the four pieces of flight information and display the flight information in a floating manner in the attitude sphere 200. The gimbal orientation may be displayed in the attitude sphere 200 in together with the unmanned aerial vehicle mark 300 according to a requirement of the user. The user may alternatively hide any piece of flight information displayed in the floating manner in the attitude sphere 200, to prevent presence of excessive flight information in the attitude sphere 200 to disturb the user. The gimbal orientation enables the user to intuitively view a gimbal photographing direction and a gimbal photographing angle of the unmanned aerial vehicle in the attitude sphere 200, making it easy for the user to adjust a photographing angle of a photographing target.

It should be noted that the gimbal of the unmanned aerial vehicle is generally disposed at the nose of the unmanned aerial vehicle. The user can determine, through a real-time orientation of the unmanned aerial vehicle mark 300, whether a current nose orientation of the unmanned aerial vehicle is consistent with a flight direction. When the user needs to perform photographing from a perspective of the unmanned aerial vehicle in the flight direction, the user may control the unmanned aerial vehicle to change the attitude so that the orientation of the unmanned aerial vehicle mark 300 in the attitude sphere 200 is consistent with the flight direction, thereby obtaining a photograph perspective of the unmanned aerial vehicle in the flight direction. Alternatively, when the user needs to perform photographing from a perspective of the unmanned aerial vehicle away from the flight direction, the user may control the unmanned aerial vehicle to change the attitude so that the orientation of the unmanned aerial vehicle mark 300 in the attitude sphere 200 is opposite to the flight direction, thereby obtaining a photograph perspective of the unmanned aerial vehicle opposite to the flight direction. The unmanned aerial vehicle mark 300 includes an aerial vehicle pattern. The aerial vehicle pattern shows an outline of the unmanned aerial vehicle and the gimbal photographing angle. The user can intuitively learn the current flight attitude of the unmanned aerial vehicle and a widest photographing angle of the gimbal from the aerial vehicle pattern.

In addition, the user may control the gimbal on the unmanned aerial vehicle to rotate, to change the orientation of the gimbal, so that the user changes the photographing angle without changing the orientation of the nose of the unmanned aerial vehicle.

Figure 6:
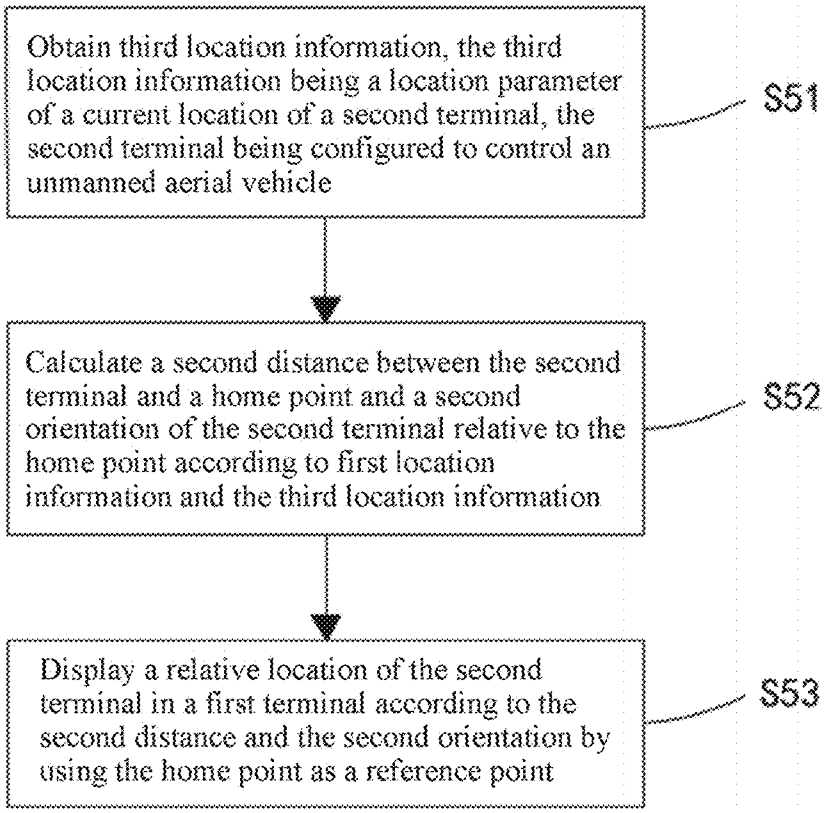
FIG. 6 is still another schematic diagram of steps of a method for monitoring an unmanned aerial vehicle according to an embodiment of the present disclosure.

In this embodiment of the present disclosure, as shown in FIG. 6, the method further includes:

Step S51: Obtain third location information, the third location information being a location parameter of a current location of a second terminal, the second terminal being configured to control the unmanned aerial vehicle.

Step S52: Calculate a second distance between the second terminal and the home point 100 and a second orientation of the second terminal relative to the home point 100 according to the first location information and the third location information.

Step S53: Display a relative location of the second terminal in the first terminal according to the second distance and the second orientation by using the home point 100 as the reference point.

As a device for controlling the unmanned aerial vehicle, the second terminal corresponds to a second terminal mark 400 in the attitude sphere 200. When the user can hold the second terminal and freely move, the second terminal mark 400 also moves relative to the home point 100 in the attitude sphere 200 correspondingly. Therefore, if the user moves to ensure a distance at which the second terminal effectively controls the unmanned aerial vehicle, the user can determine, according to a distance between a location of the second terminal mark 400 and the unmanned aerial vehicle mark 300 in the attitude sphere 200, whether the unmanned aerial vehicle is to exceed an effective control distance of the second terminal if continuing flight. If the user requires the unmanned aerial vehicle to continue flight, the user may hold the second terminal to move toward the orientation of the unmanned aerial vehicle mark 300, thereby ensuring that the unmanned aerial vehicle is still in the effective control range of the second terminal when continuing flight. Meanwhile, the second terminal mark 400 in the attitude sphere 200 also moves relative to the home point 100 according to a movement distance of the user.

In this embodiment of the present disclosure, the flight information further includes a flight attitude of the unmanned aerial vehicle. The method for monitoring an unmanned aerial vehicle further includes:

In this embodiment of the present disclosure, the first terminal may further display a level instrument 500 and adjust the level instrument 500 in real time according to the flight attitude.

When the flight attitude of the unmanned aerial vehicle changes, for example, a fuselage of the unmanned aerial vehicle changes from a horizontal state to tilting to the right, the level instrument 500 changes synchronously. In this case, the level instrument 500 is high on the left and low on the right. In addition, a tilt angle of the level instrument 500 is consistent with a tilt angle of the fuselage of the unmanned aerial vehicle. Therefore, when the tilt angle of the fuselage of the unmanned aerial vehicle is excessively large during flight, the user can discover and adjust the flight attitude of the unmanned aerial vehicle in a timely manner through the level instrument 500, thereby reducing a risk of falling when the user controls the unmanned aerial vehicle.

In this embodiment of the present disclosure, the first terminal may further display a north pointing mark 600.

Generally, the second terminal includes a north pointing module. The attitude sphere 200 generates the north pointing mark 600 according to the north pointing module of the second terminal. The north pointing mark 600 can provide a direction reference when the user controls the unmanned aerial vehicle, so that the user can conveniently control the unmanned aerial vehicle to reach a target area or control the unmanned aerial vehicle to return.

Figure 7:
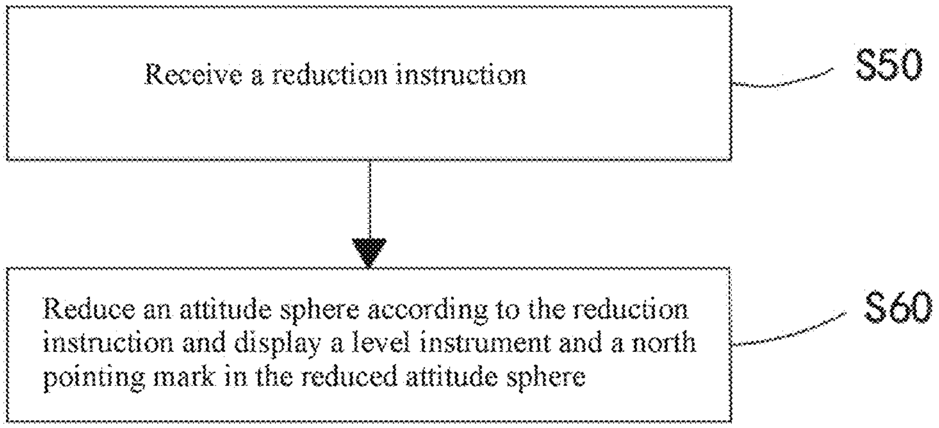
FIG. 7 is yet still another schematic diagram of steps of a method for monitoring an unmanned aerial vehicle according to an embodiment of the present disclosure.

In some other embodiments, as shown in FIG. 7, the method for monitoring an unmanned aerial vehicle further includes:

Step S50: Receive a reduction instruction.

Step S60: Reduce the attitude sphere 200 according to the reduction instruction and display the level instrument 500 and the north pointing mark 600 in the reduced attitude sphere 200.

When the user controls the unmanned aerial vehicle to reach the target area, operation space can be reserved for a remote control through the reduced attitude sphere 200, so that other operations such as hovering, photographing and changing a photographing perspective can be performed on the unmanned aerial vehicle through the remote control. Alternatively, when the user operates the unmanned aerial vehicle to fly, the attitude sphere 200 may also be reduced, to facilitate the user to observe, from the remote control, a real-time image transmitted by the unmanned aerial vehicle. It should be noted that step S50 and step S60 are optional according to an actual requirement of the user.

Alternatively, the displaying a relative location of the unmanned aerial vehicle in a first terminal according to the first location information and the second location information by using the home point as a reference point includes:

calculating a first distance between the unmanned aerial vehicle and the home point according to the first location information and the second location information; and displaying the relative location of the unmanned aerial vehicle in the first terminal according to the first distance by using the home point as the reference point.

Alternatively, the displaying the relative location of the unmanned aerial vehicle in the first terminal according to the first distance by using the home point as the reference point includes:

determining a relative location corresponding to a preset threshold in the first terminal as the relative location of the unmanned aerial vehicle mark, when the relative location of the unmanned aerial vehicle is greater than or equal to the preset threshold.

Alternatively, the method for monitoring an unmanned aerial vehicle further includes:

obtaining flight information of the unmanned aerial vehicle, the flight information including a flight direction;

calculating the first distance between the unmanned aerial vehicle and the home point and a first orientation of the unmanned aerial vehicle relative to the home point according to the first location information and the second location information; and displaying the relative location of the unmanned aerial vehicle in the first terminal according to the first distance and the first orientation by using the home point as the reference point.

Alternatively, the method for monitoring an unmanned aerial vehicle further includes: updating the location parameter of the home point of the unmanned aerial vehicle according to a user input.

Alternatively, the flight information further includes a gimbal orientation, a horizontal flight speed, a vertical flight speed and an altitude of the unmanned aerial vehicle; and the method further includes displaying at least one of the first distance, the gimbal orientation, the horizontal flight speed, the vertical flight speed or the altitude in the first terminal.

Alternatively, the method further includes:

obtaining third location information, the third location information being a location parameter of a current location of a second terminal, the second terminal being configured to control the unmanned aerial vehicle;

calculating a second distance between the second terminal and the home point and a second orientation of the second terminal relative to the home point according to the first location information and the third location information; and displaying a relative location of the second terminal in the first terminal according to the second distance and the second orientation by using the home point as the reference point.

Alternatively, the flight information further includes a flight attitude of the unmanned aerial vehicle; and the method further includes:

displaying a level instrument in the first terminal and adjusting the level instrument in real time according to the flight attitude.

Alternatively, the method further includes: displaying a north pointing mark in the first terminal.

It should be noted that the second terminal further has a one-button lift function. When the user controls the unmanned aerial vehicle through the second terminal, the user may lift the unmanned aerial vehicle by triggering a one-button lift control or control the unmanned aerial vehicle to land by triggering the one-button lift control at any time during flight of the unmanned aerial vehicle. In some other embodiments, during flight, the unmanned aerial vehicle may trigger the one-button lift control to control the unmanned aerial vehicle to land. The unmanned aerial vehicle is to fly with the home point 100 as a destination. After flying to the sky above the home point 100, the unmanned aerial vehicle lands, thereby implementing one-button automatic return and landing of the unmanned aerial vehicle.

It should be noted that the first terminal is generally a control device having a display. The attitude sphere is displayed on the display of the first terminal. An image photographed by the gimbal of the unmanned aerial vehicle can be displayed in real time on the display through the first terminal. The second terminal may be a remote control with a display, a remote control handle, a computer device, or a smart mobile device. The second terminal is connected to the first terminal. The connection between the second terminal and the first terminal may be wired connection or wireless connection. When the second terminal is connected to the first terminal, the attitude sphere on the display of the first terminal may also be displayed on the display of the second terminal. By controlling the second terminal, the user can control the unmanned aerial vehicle to fly, control the gimbal to rotate, or control the gimbal to perform photographing.

The following describes a process in which the user controls the unmanned aerial vehicle to perform aerial photography through the first terminal and the second terminal. After the user retrieves the unmanned aerial vehicle from a machinery space, the first terminal is turned on. The second terminal is then connected to the first terminal. The attitude sphere is displayed in the first terminal. In this case, the home point 100 is a location of the machinery space by default. The user triggers the one-button lift function of the second terminal so that the unmanned aerial vehicle lifts off. In this case, altitude information in the attitude sphere changes correspondingly with a lift altitude of the unmanned aerial vehicle. In addition, a lift speed of the unmanned aerial vehicle is correspondingly displayed as a vertical flight speed in the attitude sphere. When the unmanned aerial vehicle is at a suitable altitude, the user may control the second terminal to maintain the unmanned aerial vehicle at a current altitude. The user may then control the unmanned aerial vehicle to fly in the direction of the destination through the second terminal. In this case, the unmanned aerial vehicle mark 300 in the attitude sphere moves relative to the home point 100. In addition, the orientation of the unmanned aerial vehicle mark 300 relative to the home point 100 is consistent with the orientation of the unmanned aerial vehicle relative to the home point 100. As the unmanned aerial vehicle flies, the first distance (namely, the linear distance between the unmanned aerial vehicle and the home point 100) in the attitude sphere changes. In addition, the horizontal flight speed and the gimbal orientation of the unmanned aerial vehicle are displayed in the attitude sphere. When a flight distance of the unmanned aerial vehicle exceeds a preset threshold, the first distance information in the attitude sphere continues to change with the flight of the unmanned aerial vehicle. In addition, the unmanned aerial vehicle mark 300 stays on an edge of the attitude sphere 200 in the first orientation. When the flight distance of the unmanned aerial vehicle is about to exceed an effective control range, the user may control the unmanned aerial vehicle to hover at a current location and then move toward the unmanned aerial vehicle, thereby ensuring that the unmanned aerial vehicle is in the effective control range. In a process in which the user reaches a new control location, the second terminal mark 400 in the attitude sphere also moves correspondingly relative to the home point 100. When the user reaches the new control location, the user may use current coordinates of the user as a new home point 100 and input the new home point into the first terminal, to replace the original home point 100. In the process in which the user controls the unmanned aerial vehicle to fly, the user may observe the level instrument 500 to learn a current flight attitude of the unmanned aerial vehicle to adjust the flight attitude of the unmanned aerial vehicle, thereby ensuring safety of the unmanned aerial vehicle. The user may further determine whether there is a deviation in the route according to the distance and the orientation of the unmanned aerial vehicle mark 300 relative to the home point 100 and correct the flight of the unmanned aerial vehicle according to the north pointing mark 600 in the attitude sphere. During flight of the unmanned aerial vehicle, the user may control the gimbal of the unmanned aerial vehicle to rotate through the second terminal, to change the gimbal orientation, thereby changing the photographing perspective of the unmanned aerial vehicle. The user can obtain gimbal orientation information of the unmanned aerial vehicle through the gimbal orientation of the unmanned aerial vehicle mark 300 in the attitude sphere. In addition, after the user retrieves the unmanned aerial vehicle for lift-off, the user may reduce the attitude sphere at any time. The reduced attitude sphere accommodates only the level instrument and the north pointing mark. The user reduces the attitude sphere, so that an interface in the first terminal for displaying an image photographed by the gimbal is released, which facilitates the user to observe a current environment of the unmanned aerial vehicle. When photographing is completed, the user triggers the one-button lift control, so that the unmanned aerial vehicle automatically returns to the home point 100 and lands on the ground.

In the embodiments of the present disclosure, the home point 100 is used as the reference point and displayed in the first terminal, so that the unmanned aerial vehicle mark 300 corresponding to the unmanned aerial vehicle moves relative to the home point 100. In this way, during flight of the unmanned aerial vehicle, the home point 100 in the first terminal and the unmanned aerial vehicle mark 300 are always in the first terminal, thereby alleviating the problem of disorienting the user.

Figure 8:
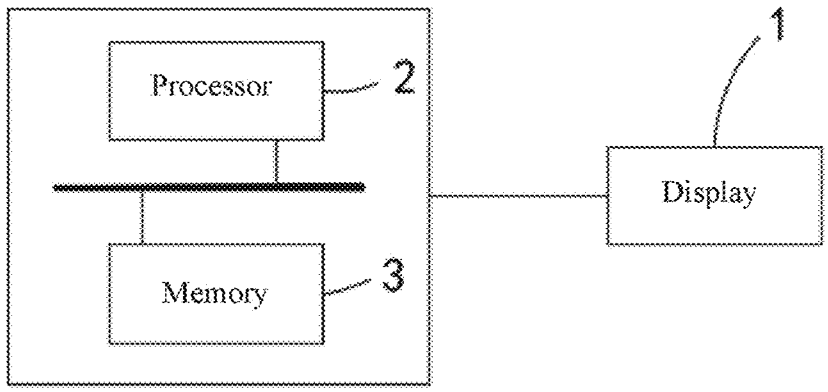
FIG. 8 is a diagram of a connection relationship in a terminal embodiment of the present disclosure.

The present disclosure further provides a terminal. Referring to FIG. 8, the terminal includes a display 1, at least one processor 2 and a memory 3 communicatively connected to the at least one processor 2. It may be understood that the memory 3 stores instructions executable by the at least one processor 2, the instructions being executed by the at least one processor 2 to implement the method for monitoring an unmanned aerial vehicle according to any of the foregoing embodiments.

The present disclosure further provides a non-volatile computer-readable storage medium, having computer executable instructions stored therein, where the computer executable instructions are configured for enabling a processor to perform the method for monitoring an unmanned aerial vehicle according to any of the foregoing embodiments.

In the embodiments of the present disclosure, the home point is used as the reference point and displayed in the first terminal, so that the unmanned aerial vehicle mark corresponding to the unmanned aerial vehicle moves relative to the home point. In this way, during flight of the unmanned aerial vehicle, the home point and the unmanned aerial vehicle mark are always in the first terminal, thereby alleviating a problem of disorienting a user.

It should be noted that, the specification of the present disclosure and the accompanying drawings thereof illustrate preferred embodiments of the present disclosure. However, the present disclosure can be implemented in various different forms, and is not limited to the embodiments described in this specification. These embodiments are not intended to be an additional limitation on the content of the present disclosure, and are described for the purpose of providing a more thorough and comprehensive understanding of the content disclosed in the present disclosure. Moreover, the above technical features can further be combined to form various embodiments not listed above, and all such embodiments shall be construed as falling within the scope of the present disclosure. Further, a person of ordinary skill in the art may make improvements and variations according to the above descriptions, and such improvements and variations shall all fall within the protection scope of the appended claims of the present disclosure.

What is claimed is:

1. A method for monitoring an unmanned aerial vehicle, comprising:

obtaining first location information, the first location information comprising a location parameter of a home point of an unmanned aerial vehicle;

obtaining second location information, the second location information comprising a location parameter of a current location of the unmanned aerial vehicle;

calculating a first distance between the unmanned aerial vehicle and the home point according to the first location information and the second location information;

displaying a relative location of the unmanned aerial vehicle in an attitude sphere displayed by a first terminal according to the first distance by using the home point as a reference point, the attitude sphere being generated by using the home point as a center, and an unmanned aerial vehicle mark indicating the unmanned aerial vehicle being always located in the attitude sphere;

obtaining flight information of the unmanned aerial vehicle, the flight information comprising a gimbal orientation, a horizontal flight speed, a vertical flight speed and an altitude of the unmanned aerial vehicle; and displaying at least one of the first distance, the gimbal orientation, the horizontal flight speed, the vertical flight speed and the altitude in the attitude sphere displayed by the first terminal.

2. The method according to claim 1, wherein the displaying the relative location of the unmanned aerial vehicle in the attitude sphere displayed by the first terminal according to the first distance by using the home point as the reference point comprises:

determining a relative location corresponding to a preset threshold in the first terminal as the relative location of the unmanned aerial vehicle, when the relative location of the unmanned aerial vehicle is greater than or equal to the preset threshold;

when the relative location of the unmanned aerial vehicle is greater than the preset threshold, the first distance information in the attitude sphere continues to change with the flight of the unmanned aerial vehicle, and the unmanned aerial vehicle mark stays on an edge of the attitude sphere.

3. The method according to claim 1, wherein the flight information further comprises a flight orientation of the unmanned aerial vehicle relative to the home point, the first orientation being calculated according to the first location information and the second location information;

the displaying the relative location of the unmanned aerial vehicle in the attitude sphere displayed by the first terminal comprises:

displaying the relative location of the unmanned aerial vehicle in the attitude sphere displayed by the first terminal according to the first distance and the first orientation by using the home point as the reference point.

4. The method according to claim 3, further comprising:

updating the location parameter of the home point of the unmanned aerial vehicle according to a user input.

5. The method according to claim 1, further comprising:

obtaining third location information, the third location information being a location parameter of a current location of a second terminal, the second terminal being configured to control the unmanned aerial vehicle;

calculating a second distance between the second terminal and the home point and a second orientation of the second terminal relative to the home point according to the first location information and the third location information; and displaying a relative location of the second terminal in the attitude sphere displayed by the first terminal according to the second distance and the second orientation by using the home point as the reference point;

wherein when the second terminal is connected to the first terminal, the attitude sphere is also displayed by the second terminal.

6. The method according to claim 5, wherein the flight information further comprises a flight attitude of the unmanned aerial vehicle; and the method further comprises:

displaying a level instrument in the attitude sphere displayed by the first terminal and adjusting the level instrument in real time according to the flight attitude.

7. The method according to claim 6, further comprising:

displaying a north pointing mark in the attitude sphere displayed by the first terminal;

reducing the attitude sphere according to a reduction instruction; and displaying the level instrument and the north pointing mark in the reduced attitude sphere.

8. A apparatus for monitoring an unmanned aerial vehicle, comprising:

a display;

at least one processor; and a memory communicatively connected to the at least one processor; wherein the memory stores instructions executable by the at least one processor, the instructions being performed by the at least one processor to implement a method for monitoring the unmanned aerial vehicle;

wherein the method for monitoring the unmanned aerial vehicle comprises:

obtaining first location information, the first location information comprising a location parameter of a home point of an unmanned aerial vehicle;

obtaining second location information, the second location information comprising a location parameter of a current location of the unmanned aerial vehicle;

calculating a first distance between the unmanned aerial vehicle and the home point according to the first location information and the second location information;

displaying a relative location of the unmanned aerial vehicle in an attitude sphere displayed by a first terminal according to the first distance by using the home point as a reference point, the attitude sphere being generated by using the home point as a center, and an unmanned aerial vehicle mark indicating the unmanned aerial vehicle being always located in the attitude sphere;

obtaining flight information of the unmanned aerial vehicle, the flight information comprising a gimbal orientation, a horizontal flight speed, a vertical flight speed and an altitude of the unmanned aerial vehicle; and displaying at least one of the first distance, the gimbal orientation, the horizontal flight speed, the vertical flight speed and the altitude in the attitude sphere displayed by the first terminal.

9. The apparatus for monitoring the unmanned aerial vehicle according to claim 8, wherein the displaying the relative location of the unmanned aerial vehicle in the attitude sphere displayed by the first terminal according to the first distance by using the home point as the reference point comprises:

determining a relative location corresponding to a preset threshold in the first terminal as the relative location of the unmanned aerial vehicle, when the relative location of the unmanned aerial vehicle is greater than or equal to the preset threshold;

when the relative location of the unmanned aerial vehicle is greater than the preset threshold, the first distance information in the attitude sphere continues to change with the flight of the unmanned aerial vehicle, and the unmanned aerial vehicle mark stays on an edge of the attitude sphere.

10. The apparatus for monitoring the unmanned aerial vehicle according to claim 8, wherein the flight information further comprises a flight orientation of the unmanned aerial vehicle relative to the home point, the first orientation being calculated according to the first location information and the second location information;

the displaying the relative location of the unmanned aerial vehicle in the attitude sphere displayed by the first terminal comprises:

displaying the relative location of the unmanned aerial vehicle in the attitude sphere displayed by the first terminal according to the first distance and the first orientation by using the home point as the reference point.

11. The apparatus for monitoring the unmanned aerial vehicle according to claim 10, wherein the method further comprises:

updating the location parameter of the home point of the unmanned aerial vehicle according to a user input.

12. The apparatus for monitoring the unmanned aerial vehicle according to claim 8, wherein the method further comprises:

obtaining third location information, the third location information being a location parameter of a current location of a second terminal, the second terminal being configured to control the unmanned aerial vehicle;

calculating a second distance between the second terminal and the home point and a second orientation of the second terminal relative to the home point according to the first location information and the third location information; and displaying a relative location of the second terminal in the attitude sphere displayed by the first terminal according to the second distance and the second orientation by using the home point as the reference point;

wherein when the second terminal is connected to the first terminal, the attitude sphere is also displayed by the second terminal.

13. The apparatus for monitoring the unmanned aerial vehicle according to claim 12, wherein the flight information further comprises a flight attitude of the unmanned aerial vehicle; and the method further comprises:

displaying a level instrument in the attitude sphere displayed by the first terminal and adjusting the level instrument in real time according to the flight attitude.

14. The apparatus for monitoring the unmanned aerial vehicle according to claim 13, wherein the method further comprises:

displaying a north pointing mark in the attitude sphere displayed by the first terminal;

reducing the attitude sphere according to a reduction instruction; and displaying the level instrument and the north pointing mark in the reduced attitude sphere.

15. A non-transitory computer-readable storage medium storing a computer program, wherein the computer program, when executed by a processor, causes the processor to perform steps comprising:

obtaining first location information, the first location information comprising a location parameter of a home point of an unmanned aerial vehicle;

obtaining second location information, the second location information comprising a location parameter of a current location of the unmanned aerial vehicle;

calculating a first distance between the unmanned aerial vehicle and the home point according to the first location information and the second location information;

displaying a relative location of the unmanned aerial vehicle in an attitude sphere displayed by a first terminal according to the first distance by using the home point as a reference point, the attitude sphere being generated by using the home point as a center, and an unmanned aerial vehicle mark indicating the unmanned aerial vehicle being always located in the attitude sphere;

obtaining flight information of the unmanned aerial vehicle, the flight information comprising a gimbal orientation, a horizontal flight speed, a vertical flight speed and an altitude of the unmanned aerial vehicle; and displaying at least one of the first distance, the gimbal orientation, the horizontal flight speed, the vertical flight speed and the altitude in the attitude sphere displayed by the first terminal.

16. The non-transitory computer-readable storage medium according to claim 15, wherein the displaying the relative location of the unmanned aerial vehicle in the attitude sphere displayed by the first terminal according to the first distance by using the home point as the reference point comprises:

determining a relative location corresponding to a preset threshold in the first terminal as the relative location of the unmanned aerial vehicle, when the relative location of the unmanned aerial vehicle is greater than or equal to the preset threshold;

when the relative location of the unmanned aerial vehicle is greater than the preset threshold, the first distance information in the attitude sphere continues to change with the flight of the unmanned aerial vehicle, and the unmanned aerial vehicle mark stays on an edge of the attitude sphere.

17. The non-transitory computer-readable storage medium according to claim 15, wherein the flight information further comprises a flight orientation of the unmanned aerial vehicle relative to the home point, the first orientation being calculated according to the first location information and the second location information;

the displaying the relative location of the unmanned aerial vehicle in the attitude sphere displayed by the first terminal comprises:

displaying the relative location of the unmanned aerial vehicle in the attitude sphere displayed by the first terminal according to the first distance and the first orientation by using the home point as the reference point.

18. The non-transitory computer-readable storage medium according to claim 15, further comprising:

obtaining third location information, the third location information being a location parameter of a current location of a second terminal, the second terminal being configured to control the unmanned aerial vehicle;

calculating a second distance between the second terminal and the home point and a second orientation of the second terminal relative to the home point according to the first location information and the third location information; and displaying a relative location of the second terminal in the attitude sphere displayed by the first terminal according to the second distance and the second orientation by using the home point as the reference point;

wherein when the second terminal is connected to the first terminal, the attitude sphere is also displayed by the second terminal.

19. The non-transitory computer-readable storage medium according to claim 18, wherein the flight information further comprises a flight attitude of the unmanned aerial vehicle; and the method further comprises:

displaying a level instrument in the attitude sphere displayed by the first terminal and adjusting the level instrument in real time according to the flight attitude.

20. The non-transitory computer-readable storage medium according to claim 19, further comprising:

displaying a north pointing mark in the attitude sphere displayed by the first terminal;

reducing the attitude sphere according to a reduction instruction; and displaying the level instrument and the north pointing mark in the reduced attitude sphere.

* * * * *